United States Patent [19]

Aujourd'hui

[11] Patent Number: 4,889,729
[45] Date of Patent: Dec. 26, 1989

[54] COATED EDIBLE ARTICLE WITH HOLDING MEMBER TO PREVENT FINGER SOILING

[76] Inventor: Rene F. Aujourd'hui, Lambergstrasse 4, 8610 Uster, Switzerland

[21] Appl. No.: 73,370

[22] Filed: Jul. 6, 1987

Related U.S. Application Data

[63] Continuation of Ser. No. 673,594, Nov. 21, 1984, abandoned.

[30] Foreign Application Priority Data

Nov. 29, 1983 [CH] Switzerland .................... 6379/83

[51] Int. Cl.⁴ .................... A21D 15/00; A23G 3/00
[52] U.S. Cl. .................... 426/94; 426/99; 426/103; 426/104; 426/144; 426/660; 426/249; D1/122; D1/127; D1/128; D1/129; D1/130; D1/199
[58] Field of Search .................... 421/94, 91, 95, 249, 421/99, 101, 104, 144, 138, 139, 660; DI/122, 127–130, 199

[56] References Cited

U.S. PATENT DOCUMENTS

| | | | |
|---|---|---|---|
| 354,509 | 12/1886 | Grimm | 426/104 |
| 1,638,480 | 8/1927 | Feybusch | 426/139 |
| 1,913,851 | 6/1933 | Oprean | 426/91 |
| 1,947,010 | 2/1934 | Jones | 426/91 |

OTHER PUBLICATIONS

Berolzheimer, The Cookie Book, Consolidated Book Pub., Chicago, Ill., 1952, pp. 30 and 33.
Crocker, Betty, "How to Have the Most Fun with Cake Mixes", U.S.A., pp. 5, 7, 10, 14 and 22.

Primary Examiner—Jeanette Hunter
Attorney, Agent, or Firm—W. Thad Adams, III

[57] ABSTRACT

A confection having at least one wafer sheet, a coating which melts at or below body temperature on an outer side of the wafer sheet; and an edible coating member applied to the surface of the coating and held by the coating to the wafer sheet. The holding member being of a size large enough to be held by a fingertip but smaller than the wafer sheet and being made of a substance which does not melt at or below body temperature.

11 Claims, 2 Drawing Sheets

COATED EDIBLE ARTICLE WITH HOLDING MEMBER TO PREVENT FINGER SOILING

This application is a continuation of application Ser. No. 673,594, filed Nov. 21, 1984.

TECHNICAL FIELD AND BACKGROUND OF THE INVENTION

This invention relates to a coated edible article which includes means by which the article can be held while being consumed without soiling the fingers. The invention has application in a wide range of edible articles, such as candies, coated wafers and biscuits and other edible articles which are comprised of or are covered with a coating which melts when held in the hand and is subjected to body heat.

The particular embodiment shown in the application is of a "wafer bar" which is constructed by placing two or more wafer sheets on top of each other, with one or more types of cream filling interposed between the layers. For example, three wafer sheets may be separated by a layer of vanilla cream and a layer of nut cream. This type of arrangement provides an attractive and pleasing combination of colors. However, it has been observed that in construction of this type the flavor of the individual wafer sheets and the fillings is not distinct enough for many users. For this reason, the underside of the bar is coated with a fat glaze which enhances the flavor.

Wafer bars of the type described above are usually wrapped in a paper or cellophane sheet, or similar material. The wafer bar is removed by tearing open the packaging and pulling the wafer out of the packaging by grasping the wafer bar at the top and bottom between the thumb and index or middle finger. However, because the underside of the wafer bar is coated with the fat glaze, or other melting coatings, the finger which is in contact with the glaze becomes soiled because the melting temperature of the coating is below normal body temperature.

SUMMARY OF THE INVENTION

Therefore, it is an object of the invention to provide a coated edible article which includes means for grasping the article without soiling the fingers.

It is another object of the present invention to provide a coated edible article which is easy and clean to handle with the hands and fingers.

It is yet another object of the present invention to provide a holding member for a coated edible article, which holding means provides a decorative and attractive appearance to the article.

These and other objects of the present invention are achieved in the preferred embodiments disclosed below by providing an edible article comprising a base material having a layer thereon which melts at body temperature applied at least on one side thereof. At least one member at least the size of a finger end and comprising a non-melting substance or a substance melting at a higher temperature than body temperature is applied in at least one piece on a surface of the base material to form a raised holding member whereby the article can be handled without soiling the fingers. Preferably, the applied layer is foodstuff and may be in the shape of an oblate, a circular or oval disc, a polygonal disc or a representational shape, for example, such as an animal.

Preferably, the applied member is either flat, ribbed or provided with a wafer pattern.

According to the embodiment of the invention disclosed in this application, the applied member is fastened to the surface of the base material by means of the fat glaze or other melting coating.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
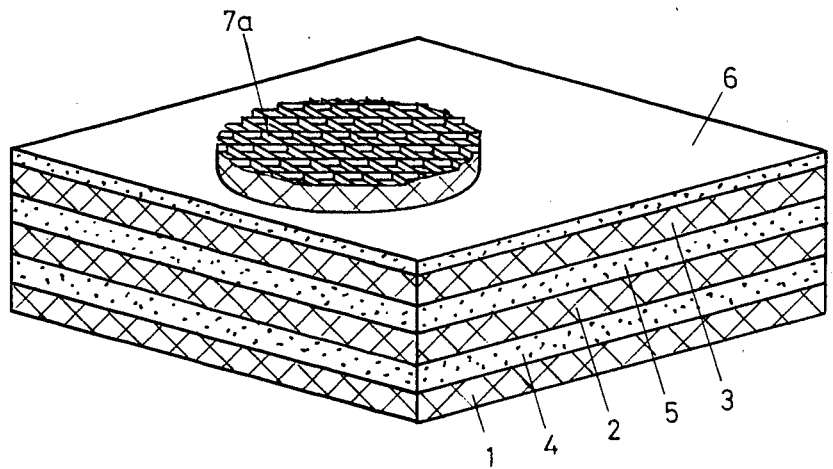
FIG. 1 is a perspective view of a wafer bar with a holding member in the shape of a circular disc affixed to one of its surfaces.

Referring now specifically to the drawings, a wafer bar according to the present invention is illustrated in FIG. 1 and includes three wafer sheets, 1, 2 and 3 and two intermediate cream layers 4 and 5. A layer 6 of a fat glaze as a flavor reinforcer is located on the outside of wafer sheet 3 which is defined as the bottom of the wafer bar.

In accordance with the invention, a further piece 7a of the wafer sheet is applied to layer 6. This wafer sheet piece 7a is formed in a circular disc and is the approximate size of a finger-end whereby it can be easily grasped and held by the thumb, index finger or middle finger.

Figure 2:
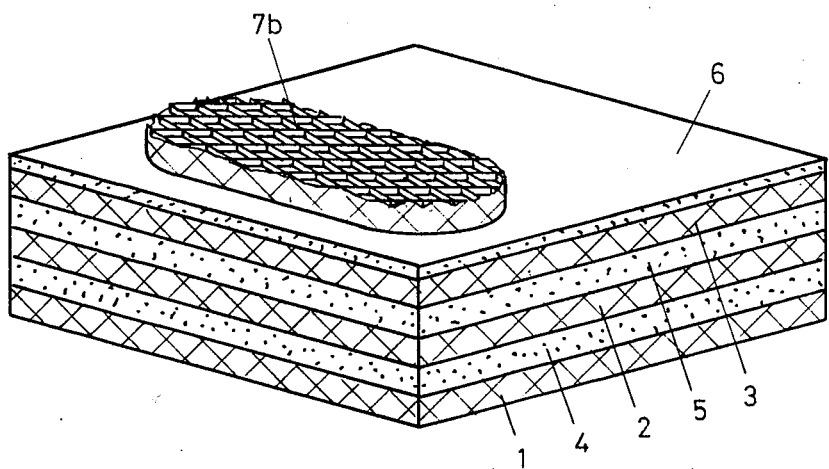
FIG. 2 is a perspective view of a wafer bar with a holding member in the shape of an oval disc affixed to one of its surfaces.

Referring now to FIG. 2, an edible article similar to that shown in FIG. 1 is illustrated. However, a piece of wafer sheet 7b in the shape of an oval is shown affixed to the bottom side of the wafer bar.

To produce a wafer bar of the type shown in FIGS. 1 and 2, the fat glaze layer 6 is applied by dipping the wafer bar in a liquid fat glaze which then solidifies by cooling. The bar is then reversed so that the fat glaze layer 6 is at the top. Then, a drop of liquid fat glaze is applied and the piece of wafer sheet 7a or 7b is laid on the drop of glaze before it cools and hardens. Once the drop of fat glaze hardens, the applied wafer sheet 7a or 7b is affixed securely to the wafer bar. During consumption, the bar can be held with two fingers without the need to penetrate into the layer of fat glaze 6. Addition of the wafer sheet piece 7a or 7b enlarges the size of the bar both by the thickness of the sheet 7a or 7b itself plus the thickness of the fat glaze layer which acts as the adhesive.

Instead of applying the fat glaze material, it is also possible to use some other foodstuff which has approximately the same melting temperature as the glaze and which is otherwise edible.

Figure 3:
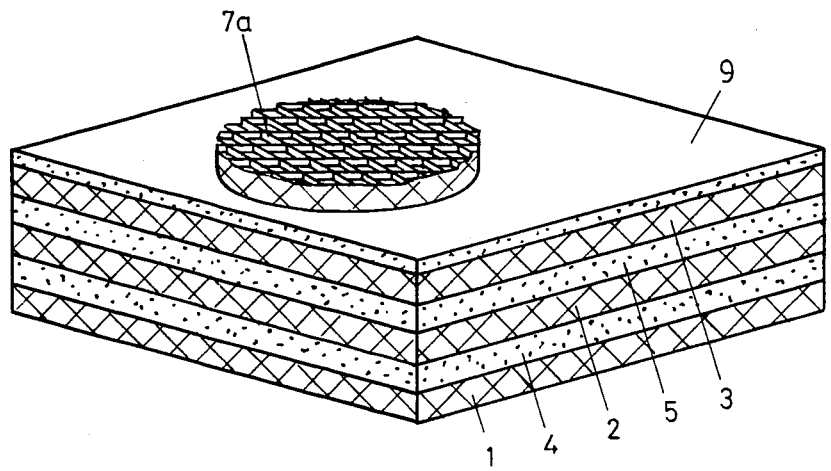
FIG. 3 is a perspective view of a wafer bar with a holding member in the shape of a circular disc affixed to one of its surfaces, which surface has a melting coating other than a fat glaze thereon.

Referring now to FIG. 3, a meltable coating layer 9 is applied to the top of wafer sheet 3 which, again, is defined as the bottom of the wafer bar.

Figure 4:
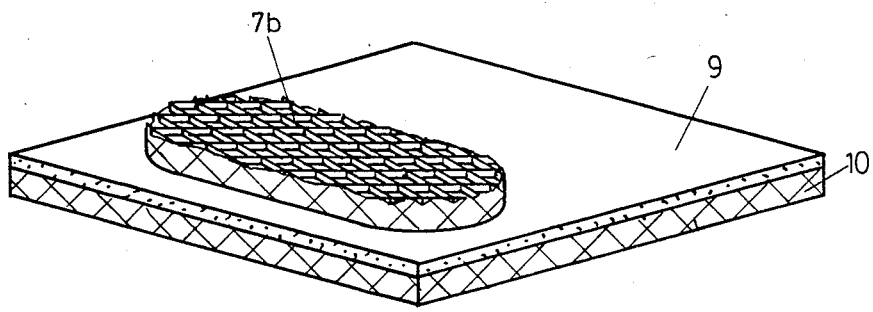
FIG. 4 is a perspective view of a wafer bar with a holding member in the shape of an oval disc affixed to one of its surfaces, wherein the wafer bar comprises a single wafer having a coating of fat glaze or other melting coating thereon.

Likewise, in FIG. 4, a wafer bar construction having only a single wafer layer 10 topped by coating 9 which may either be of a fat glaze or another melting coating is shown.

In addition to the shapes shown in FIGS. 1 and 2, the applied wafer sheet piece 7a and 7b can have any form and popular subjects, especially animals, or the like which appeal to children can be used for the piece of wafer sheet by means of a mold cutting.

In addition to the particular embodiments disclosed above, candies, biscuits and cookies of any type and form with a coating on one or more sides can naturally be provided with raised holding members whereby the product can be handled without soiling the fingers. Likewise, the wafer sheet pieces can be applied to chocolate products in order to avoid melting the chocolate by holding it in the hand.

An edible article having a raised holding member whereby the article can be handled without soiling the fingers is described above. Various details of the invention may be changed without departing from its scope. Furthermore, the foregoing description of the preferred embodiment according to the present invention is provided for the purpose of illustration and not for the purpose of limitation—the invention being defined by the claims.

I claim:

1. A confection comprising:
   (a) at least one wafer sheet;
   (b) a coating which melts at or below body temperature, on an outer side of said at least one wafer sheet to form a wafer sheet and coating assembly; and
   (c) an edible holding member applied to the surface of said coating and held by said coating to said wafer sheet, said holding member being at least of a size large enough to be held by a fingertip but having a relatively small surface area in relation to the surface area of said coating so as not to affect the taste balance of the wafer sheet and coating assembly, said holding member being comprised of a substance which does not melt at or below body temperature, whereby the article can be handled without soiling the fingers.

2. A confection as claimed in claim 1, wherein the holding member comprises a foodstuff.

3. A confection as claimed in claim 2, wherein the holding member is in the shape of an oblate.

4. A confection as claimed in claim 3, wherein the holding member comprises a wafer.

5. A confection as claimed in claim 1, wherein the holding member is in the shape of a circular disc.

6. A confection as claimed in claim 1, wherein the holding member is in the shape of an oval disc.

7. A confection as claimed in claim 1, wherein the holding member is in the shape of a polygonal disk.

8. A confection as claimed in claim 1, wherein the holding member is in the shape of a representational shape.

9. A confection as claimed in claim 1, wherein the holding member is flat.

10. A confection as claimed in claim 1, wherein at least the outer face of the holding member is ribbed or is provided with a wafer pattern.

11. A confection as claimed in claim 1, wherein the holding member is fastened to the surface of the coating by means of a foodstuff heated to melting temperature, and applied between the coating and holding member whereupon said foodstuff acts as a cement.

* * * * *